US012651346B2

(12) United States Patent
Borges et al.

(10) Patent No.: US 12,651,346 B2
(45) Date of Patent: Jun. 9, 2026

(54) EDGE IDENTIFICATION OF DOCUMENTS WITHIN CAPTURED IMAGE

(71) Applicant: Hewlett-Packard Development Company, L.P., Spring, TX (US)

(72) Inventors: Rafael Borges, Porto Alegre (BR); Lucas Nedel Kirsten, Porto Alegre (BR); Luis Fernando Becker Santos, Porto Alegre (BR); Ricardo Ribani, Barueri (BR)

(73) Assignee: Hewlett-Packard Development Company, L.P., Spring, TX (US)

( * ) Notice: Subject to any disclaimer, the term of this patent is extended or adjusted under 35 U.S.C. 154(b) by 322 days.

(21) Appl. No.: 18/276,371

(22) PCT Filed: Feb. 9, 2021

(86) PCT No.: PCT/US2021/017190

§ 371 (c)(1),
(2) Date: Aug. 8, 2023

(87) PCT Pub. No.: WO2022/173415

PCT Pub. Date: Aug. 18, 2022

(65) Prior Publication Data

US 2024/0112348 A1     Apr. 4, 2024

(51) Int. Cl.
*G06T 7/13* (2017.01)

(52) U.S. Cl.
CPC ...... *G06T 7/13* (2017.01); *G06T 2207/20076* (2013.01); *G06T 2207/20081* (2013.01); *G06T 2207/20084* (2013.01); *G06T 2207/30176* (2013.01)

(58) Field of Classification Search
CPC ............ G06T 7/13; G06T 2207/20076; G06T 2207/20081; G06T 2207/20084; G06T 2207/30176; G06T 7/12; G06N 3/045; G06V 10/44; G06V 30/40; G06V 30/414
See application file for complete search history.

(56) References Cited

U.S. PATENT DOCUMENTS

| | | | | |
|---|---|---|---|---|
| 11,023,767 B2 * | 6/2021 | Sarshogh | ......... | G06V 30/18057 |
| 2011/0069180 A1 * | 3/2011 | Nijemcevic | ........... | H04N 23/80 |
| | | | | 348/333.12 |
| 2015/0106754 A1 | 4/2015 | Somasundaram et al. | | |
| 2015/0146265 A1 | 5/2015 | Kim et al. | | |
| 2017/0124718 A1 * | 5/2017 | Long | ........................ | G06T 7/11 |

(Continued)

FOREIGN PATENT DOCUMENTS

| | | |
|---|---|---|
| CN | 110334596 A | 10/2019 |
| EP | 3163504 A1 | 5/2017 |

(Continued)

*Primary Examiner* — Matthew C Bella
*Assistant Examiner* — Andrew B. Jones
(74) *Attorney, Agent, or Firm* — Michael Dryja

(57) ABSTRACT

A backbone machine learning model is applied to a captured image of a number of documents to identify image features of the captured image. A head machine learning model is applied to the image features to identify a number of candidate quadrilaterals within the captured image. An edge detection technique is applied to each candidate quadrilateral to identify edges of a corresponding document of the captured image within the candidate quadrilateral.

15 Claims, 6 Drawing Sheets

(56)                References Cited

U.S. PATENT DOCUMENTS

| | | | |
|---|---|---|---|
| 2017/0346976 | A1 | 11/2017 | Pashintsev et al. |
| 2018/0211107 | A1 | 7/2018 | Segalovitz et al. |
| 2018/0293731 | A1 | 10/2018 | Palaniyappan et al. |
| 2019/0180094 | A1* | 6/2019 | Zagaynov ............. G06F 18/217 |
| 2020/0364875 | A1* | 11/2020 | Mondal .................. G06V 10/48 |
| 2021/0224969 | A1* | 7/2021 | Zagaynov ............. G06N 20/20 |

FOREIGN PATENT DOCUMENTS

| | | | | |
|---|---|---|---|---|
| RU | 2656708 C1 | * | 6/2018 | ............. G06F 18/00 |
| RU | 2726185 C1 | | 7/2020 | |

* cited by examiner

EDGE IDENTIFICATION OF DOCUMENTS WITHIN CAPTURED IMAGE

BACKGROUND

While information is increasingly communicated in electronic form with the advent of modern computing and networking technologies, physical documents, such as printed and handwritten sheets of paper and other physical media, are still often exchanged. Such documents can be converted to electronic form by a process known as optical scanning. Once a document has been scanned as a digital image, the resulting image may be archived, or may undergo further processing to extract information contained within the document image so that the information is more usable. For example, the document image may undergo optical character recognition (OCR), which converts the image into text that can be edited, searched, and stored more compactly than the image itself.

DETAILED DESCRIPTION

As noted in the background, a physical document can be scanned as a digital image to convert the document to electronic form. Traditionally, dedicated scanning devices have been used to scan documents to generate images of the documents. Such dedicated scanning devices include sheet-fed scanning devices, flatbed scanning devices, and document camera scanning devices, as well as multifunction devices (MFDs) or all-in-one (AIO) devices that have scanning functionality in addition to other functionality such as printing functionality. However, with the near ubiquitousness of smartphones and other usually mobile computing devices that include cameras and other types of image-capturing sensors, documents are often scanned with such non-dedicated scanning devices.

When scanning documents using a dedicated scanning device, a user may not have to individually feed each document into the device. For example, the scanning device may have an automatic document feeder (ADF) in which a user can load multiple documents. Upon initiation of scanning, the scanning device individually feeds and scans the documents, which may result in generation of an electronic file for each document or a single electronic file including all the documents. For example, the electronic file may be in the portable document format (PDF) or another format, and in the case in which the file includes all the documents, each document may be in a separate page of the file.

However, some dedicated scanning devices, such as lower-cost flatbed scanning devices as well as many document camera scanning devices, do not have ADFs. Non-dedicated scanning devices such as smartphones also lack ADFs. To scan multiple documents, a user has to manually position and cause the device to scan or capture images of the documents individually, on a per-document basis. Scanning multiple documents is therefore more tedious, and much more time consuming, than when using a dedicated scanning device that has an ADF.

Techniques described herein ameliorate these and other difficulties. The described techniques permit multiple documents to be concurrently scanned, instead of having to individually scan or capture images of the documents on a per-document basis. A dedicated scanning device or a non-dedicated scanning device can be used to capture an image of multiple documents. For example, multiple documents can be positioned on the platen of a flatbed scanning device and scanned together as a single captured image, or the camera of a smartphone can be used to capture an image of the documents as positioned on a desk or other surface in a non-overlapping manner. The described techniques identify the edges of each document within the captured image, permitting the documents to be segmented into different electronic files or as different pages of the same file.

Figure 1:
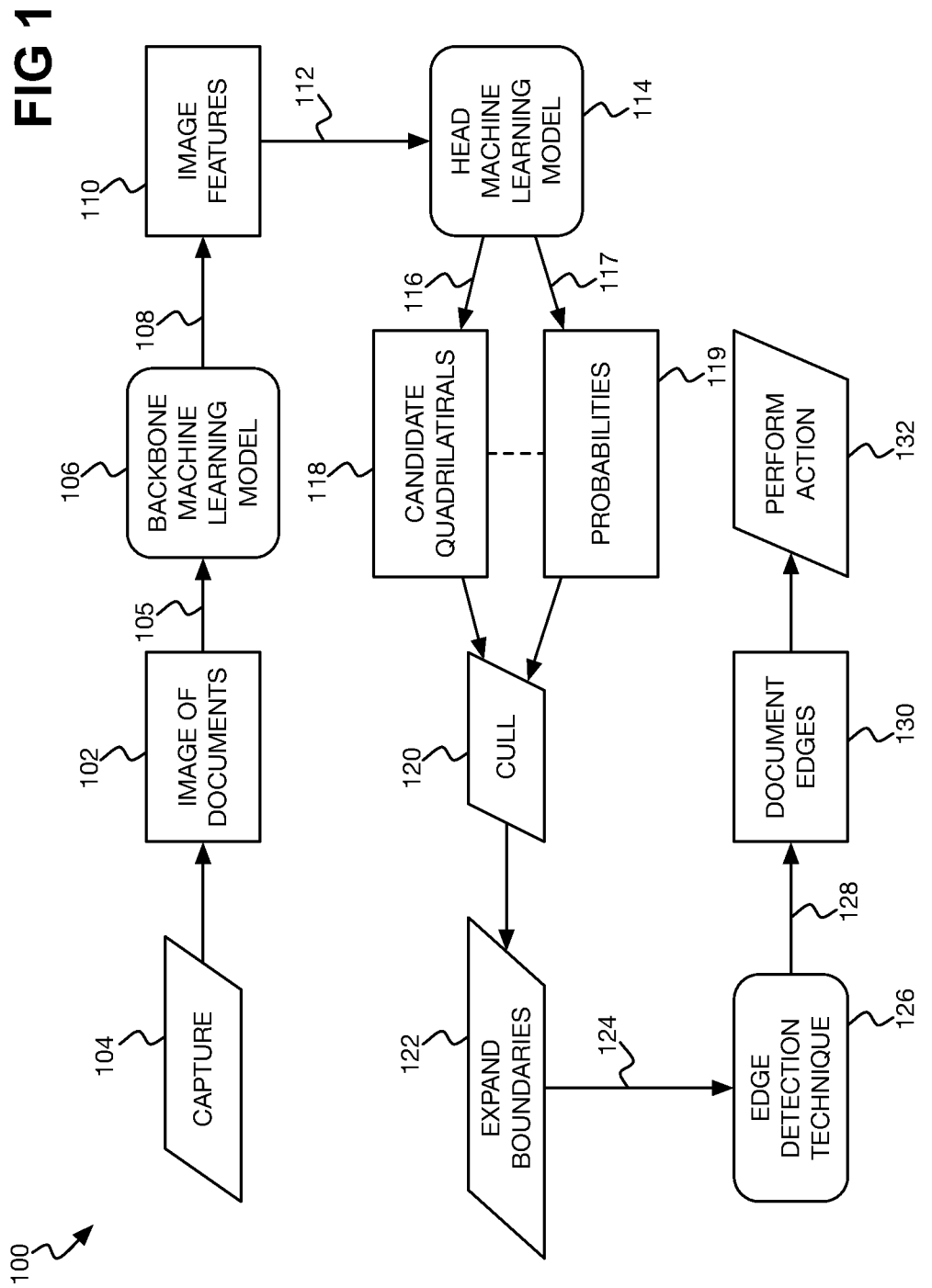
FIG. 1 is a diagram of an example process for identifying edges of documents within a captured image.

FIG. 1 shows an example process 100 for identifying edges of multiple documents within the same captured image. An image 102 of multiple documents is captured (104). The documents are positioned in such a way so that they do not overlap before the image 102 of them is captured, such as by using a flatbed scanning device or other dedicated scanning device, or by using a non-dedicated scanning device such as a smartphone having a camera. The captured image 102 may be in an electronic image file format such as the joint photographic experts group (JPEG) format, the portable network graphics (PNG) format, or another file format.

The captured image 102 of the documents is input (105) into a backbone machine learning model 106 that correspondingly outputs (108) image features 110. The machine learning model 106 is a backbone machine learning model in that it extracts, or identifies, features of the image 102 on which basis one or more other machine learning models can perform prediction or classification. The image features 110 may be in the form of a feature map, a feature vector, or another representation, and contain higher level summarizing information regarding the captured image 102.

The backbone machine learning model 106 may be a convolutional neural network machine learning model having convolutional layers followed by pooling layers that generate, identify, or extract the image features 110 from the captured image 102. Examples include different versions of the MobileNet machine learning model. The MobileNet machine learning model is described in A. Howard et al., "MobileNets: Efficient Convolutional Neural Networks for Mobile Vision Applications," arXiv: 1704.04861 [cs.CV], April 2017; M. Sandler et al. "MobileNetV2: Inverted Residuals and Linear Bottlenecks," arXiv: 1801.104381 [cs.CV], March 2019; and A. Howard et al., "Search for MobileNetV3," arXiv: 1905.02244 [cs.CV], November 2019.

The image features 110 of the captured image 102 are input (112) into a head machine learning model 114 that correspondingly outputs (116) candidate quadrilaterals 118. The machine learning model 114 is a head machine learning model in that it performs a prediction on the basis of image features 110 extracted by a different machine learning model (i.e., the backbone machine learning model 106). Each candidate quadrilateral 118 is a four-sided polygon within the captured image 102 that the head machine learning model 108 has predicted includes a different corresponding document within the captured image 102. The head machine learning model 114 may identify each candidate quadrilateral 118 by the coordinates of its four corners within the captured image 102.

The head machine learning model 108 may also provide or output (117) probabilities 119 for the candidate quadrilaterals 118. Each probability 119 specifies or corresponds to the likelihood that its associated candidate quadrilateral 118 includes one of the documents of the captured image 102. The probabilities 119 can thus be considered as confidence intervals as to how confident the head machine learning model 108 is that the respective candidate quadrilaterals 118 each include a document of the captured image 102. The probabilities 119 may be expressed as a value between zero and one in correspondence with increasing likelihood that they include documents of the captured image 102.

The head machine learning model 108 may be a one-shot, or single-shot, convolutional neural network machine learning model, which permits multiple candidate quadrilaterals 118 to be detected within the captured image 102 from a single execution of the model 108 against the image features 110 of the image 102. Examples include that in W. Liu, et al., "SSD: Single Shot MultiBox Detector," arXiv: 1512.02325 [cs.CV], December 2016. The head machine learning model 108 may be a head module including fully connected layers that complements the backbone network of the backbone machine learning model 106 within an overall convolutional neural network architecture.

Dividing the identification of candidate quadrilaterals 118 that likely include different documents of the captured image 102 over two machine learning models 106 and 114 can permit each of the machine learning models 106 and 114 to be individually and separately selected. For example, different head machine learning models 114 can be assessed for how accurately they identify candidate quadrilaterals 118 based on the same image features 110 identified by a given backbone machine learning model 106. Similarly, the image features 110 extracted by the backbone machine learning model 106 may be input into different head modules that perform different predictions or classifications.

The candidate quadrilaterals 118 can be culled (120) so that just those that are most likely to correspond to documents within the captured image 102 are considered. The candidate quadrilaterals 118 may be culled based on their respective probabilities 119. For example, any candidate quadrilateral 118 having a probability less than a threshold may be discarded, or removed from further consideration. The threshold may be 50%, for instance.

The candidate quadrilaterals 118 that the head machine learning model 114 identifies may not be well aligned to their corresponding documents of the captured image 102. For instance, a candidate quadrilateral 118 may include part of the background in addition to a corresponding document. The boundaries (i.e., edges) of the candidate quadrilaterals 118 themselves, in other words, are unlikely to correspond to the edges of the documents within the captured image 102.

The candidate quadrilaterals 118 that the head machine learning model 114 identifies may similarly not each completely encompass a corresponding document within the captured image 102. Rather, the document included in a candidate quadrilateral 118 may be slightly cut off at one or multiple edges and/or at one or multiple corners. To ensure that the documents to which the candidate quadrilaterals 118 correspond are fully or completely included in or encompassed by the quadrilaterals 118, the boundaries (i.e., edges)

of each candidate quadrilateral 118 that remains after culling may be outwardly increased or expanded (122).

For instance, each boundary of each such candidate quadrilateral 118 may be increased by a specified number of pixels. This may be achieved by appropriately increasing or decreasing each coordinate of each corner of each candidate quadrilateral 118. For example, if a candidate quadrilateral 118 is specified by upper-left, upper-right, lower-right, and lower-left corners having the coordinates (x1,y1), (x2,y2), (x3,y3), (x4,y4), boundary expansion can be performed by appropriately increasing or decreasing each x coordinate by dx and appropriately increasing or decreasing each y coordinate by dy. The resultantly boundary-expanded candidate quadrilateral 118 is thus specified by four corners having the coordinates (x1-dx,y1-dy), (x2+dx,y2-dy), (x3+dx,y3+dy), (x4-dx,y4+dy).

In this example, dx and dy may be equal or unequal to one another. The number of pixels by which each boundary of each candidate quadrilateral 118 that remains after culling is expanded may be an absolute number, or may be based as a percentage of the dimensions of the captured image 102 or the candidate quadrilateral 118 itself. As one example, each corner of each candidate quadrilateral 118 may have its x coordinate increased or decreased by a percentage of the length of the captured image 102 along the x direction, and may have its y coordinate increased or decreased by a percentage of the height of the captured image 102 along they direction.

The candidate quadrilaterals 118 are each input (124) to an edge detection technique 126 after boundary expansion. For an input candidate quadrilateral 118, the edge detection technique 126 extract, identifies, or outputs (128) edges 130 of the document of the captured image 102 included in or encompassed by that candidate quadrilateral 118. For instance, the edge detection technique 126 may output the coordinates of each of four corners of the document within the captured image 102. If a candidate quadrilateral 118 is specified by upper-left, upper-right, lower-right, and lower-left corners having the coordinates (x1,y1), (x2,y2), (x3,y3), (x4,y4), for example, the edge detection technique 126 may output corresponding corners of the document included by the quadrilateral 118 as having the coordinates (xd1,yd1), (xd2,yd2), (xd3,yd3), (xd4,yd4). In this case, $xd1 \geq x1$, $yd1 \geq y1$, $xd2 \leq x2$, $yd2 \geq y2$, $xd3 \leq x3$, $yd3 \leq y3$, $xd4 \geq x4$, and $yd4 \leq y4$.

The edge detection technique 126 in identifying the edges 130 of the documents corresponding to the candidate quadrilaterals 118 may segment the captured image 102 into separate images corresponding to the documents. The edge detection technique 126 may further rectify and perform other image processing in outputting a separate image for each document. The image for each document may be an electronic file in the same or different image file format as the electronic file of the captured image 102.

The edge detection technique 126 may be a non-machine learning model image processing technique. An example of such an edge detection technique 126 is described in U.S. Pat. No. 7,301,564. The process 100 can thus leverage an edge detection technique 126 that is able to identify one document within an image to instead identify multiple documents within the captured image 102. The edge detection technique 126 may not have to be modified in this respect. Rather, the edge detection technique 126 can be individually and separately applied to each candidate quadrilateral 118 of the captured image 102 as a separate image, apart from the other candidate quadrilaterals 118.

The identification of edges of multiple documents within a captured image 102 in the process 100 can be performantly superior to approaches in which a non-machine learning model image processing edge detection technique is applied to the captured image 102 to identify document edges and in which a machine learning model is then applied to validate the individual documents. This is because the edge detection technique may identify a large number of possible candidates for localizing documents. As a result, much of the information forwarded to a machine learning model to classify documents may be irrelevant. As such, the overall process can be computationally expensive.

Therefore, rather than using a machine learning model to validate whether document edges identified by such a non-machine learning model image processing edge detection technique correspond to a document within the captured image 102, the process 100 in effect operates in reverse. That is, in the process 100, a machine learning architecture (made up of a backbone machine learning model 106 and a head machine learning model 114) is initially applied to identify candidate quadrilaterals 118 that are likely to include documents of the captured image 102, but which do not well define the edges of these documents. An edge detection technique is then subsequently applied to each candidate quadrilateral 118 individually to well define the document edges and thus the document in question.

The process 100 can conclude by performing an action (132) on the individual documents that have been identified within the captured image 102 on the basis of their edges 130. For instance, as noted above, separate images for the documents may be saved in corresponding electronic image files, or may be displayed to the user. Other actions that may be performed include image enhancement, optical character recognition (OCR), and so on.

Figure 2A:
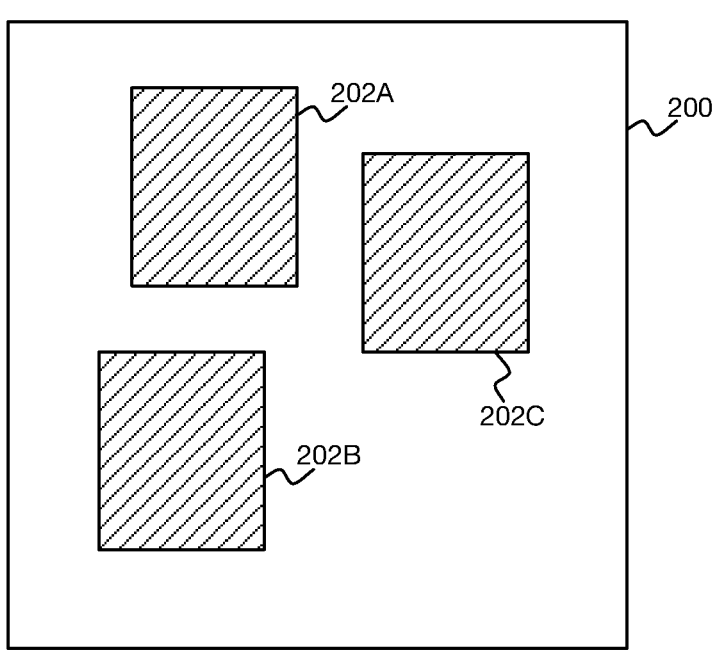
FIGS. 2A, 2B, and 2C are diagrams of example performance of the process of FIG. 1.
Figure 2B:
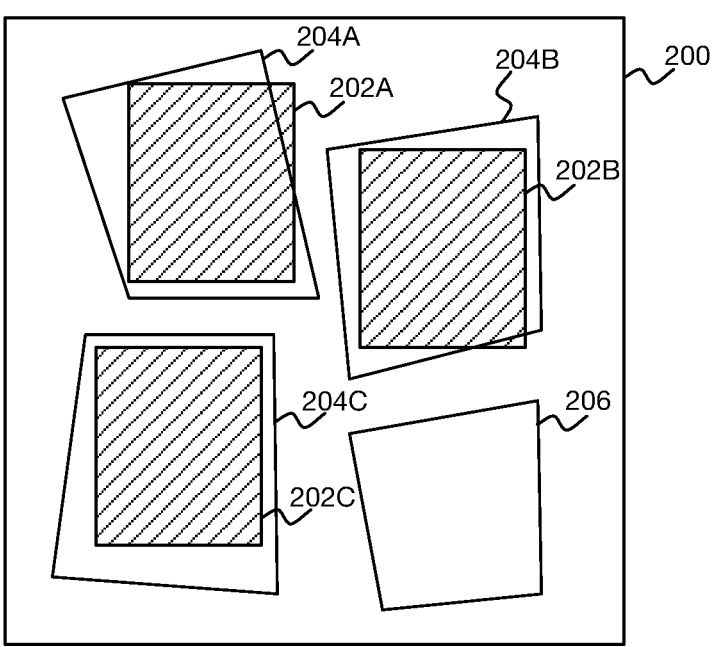
Figure 2C:
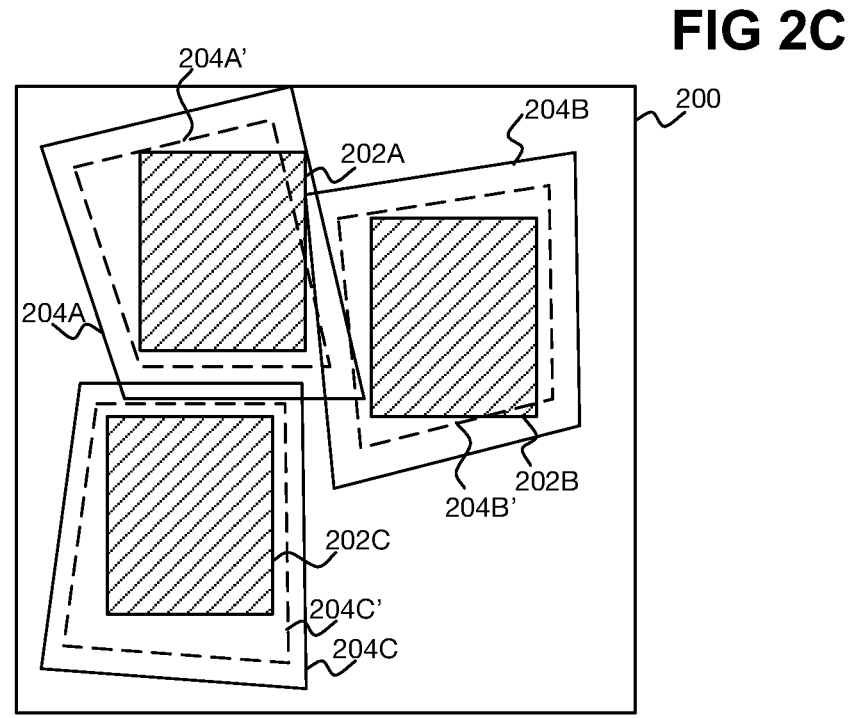

FIGS. 2A, 2B, and 2C illustratively depict example performance of the process 100. In FIG. 2A, a captured image 200 including three documents 202A, 202B, and 202C, which are collectively referred to as the documents 202, is shown. Performance of the process 100 thus ultimately identifies the edges of each document 202, and therefore individually well defines the documents 202.

In FIG. 2B, candidate quadrilaterals 204A, 204B, 204C, which are collectively referred to as the candidate quadrilaterals 204, and a candidate quadrilateral 206 are shown. The candidate quadrilaterals 204 and 206 are identified after the backbone machine learning model 106 of FIG. 1 has been applied to the captured image 200 to identify or extract image features of the image 200 and the head machine learning model 114 of FIG. 1 has then been applied to these image features. The candidate quadrilaterals 204A, 204B, and 204C respectively correspond to the documents 202A, 202B, and 202C. By comparison, the candidate quadrilateral 206 does not correspond to any document 202. The head machine learning model 114 may assign the candidate quadrilateral 206 a lower probability than the quadrilaterals 204, and as such the candidate quadrilateral 206 may be culled in the process 100.

The candidate quadrilaterals 204 do not well define their corresponding documents 202 of the captured image 200, however. Each candidate quadrilateral 204 includes a portion of the background of the image 200 as well as a corresponding document 202. Furthermore, the documents 202A and 202B are not completely included in the respective candidate quadrilaterals 204A and 204B. For instance, the upper-right corner of the document 202A is cut off in the candidate quadrilateral 204A, and the lower-right corner of the document 202B is cut off in the candidate quadrilateral 204B.

In FIG. 2C, the candidate quadrilaterals 204 are shown after boundary expansion in the process 100. The candidate quadrilaterals 204 with their original boundaries are identified with dotted lines as the candidate quadrilaterals 204A', 204B', and 204C', and are collectively referred to as the candidate quadrilaterals 204'. After boundary expansion, each document 202 is completely and fully included within a respective candidate quadrilateral 204. Therefore, application of the edge detection technique 126 of FIG. 1 to each boundary-expanded candidate quadrilateral 204 results in identification of the edges of a corresponding document 202, and thus in well definition of the document 202 in question.

Figure 3:
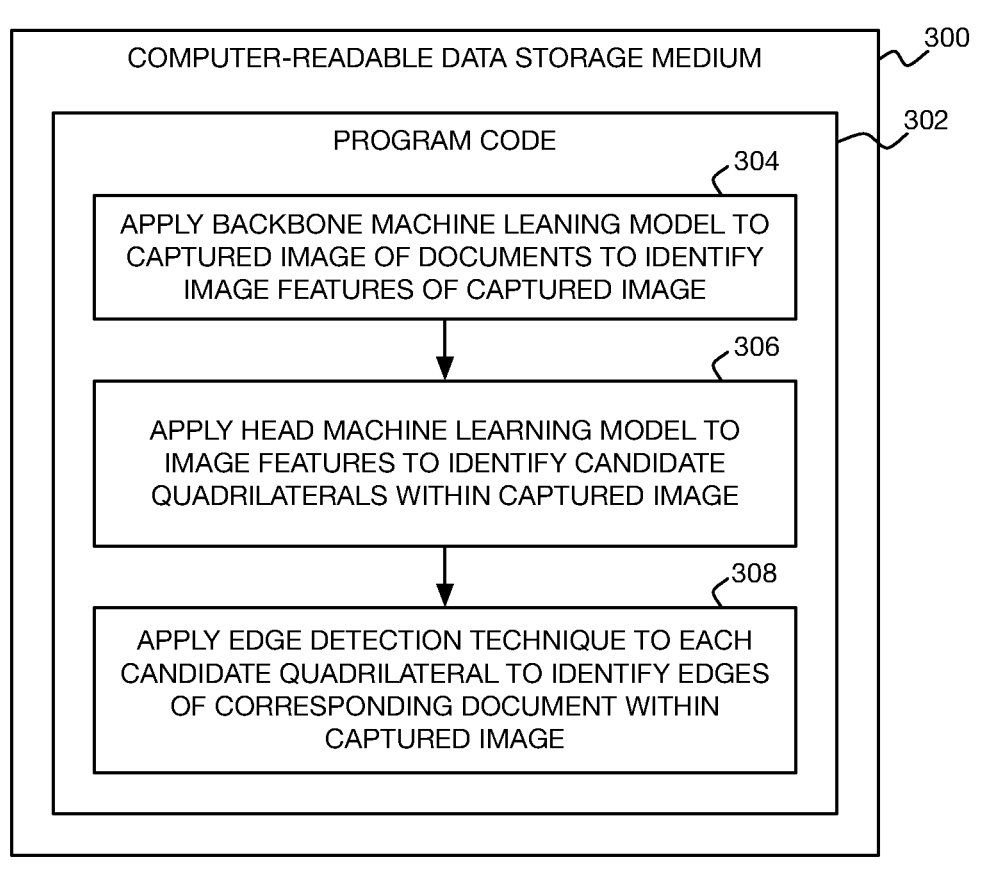
FIG. 3 is a diagram of an example non-transitory computer-readable data storage medium storing program code for identifying edges of documents within a captured image.

FIG. 3 shows an example non-transitory computer-readable data storage medium 300 storing program code 302. The program code 302 is executable by a processor of a computing device to perform processing. The computing device that executes the program code 302 may be a device that captures an image of multiple documents, such as a smartphone. The computing device that executes the program code 302 may instead be a different device than that which captured the image. For example, the computing device may be a desktop, notebook, laptop, server, or other type computer communicatively connected to a device that captured the image.

The processing includes applying a backbone machine learning model to a captured image of multiple documents to identify image features of the captured image (304). The processing includes applying a head machine learning model to the image features to identify candidate quadrilaterals within the captured image (306). The processing includes applying an edge detection technique to each candidate quadrilateral to identify edges of a corresponding document of the captured image within the candidate quadrilateral (308).

Figure 4:
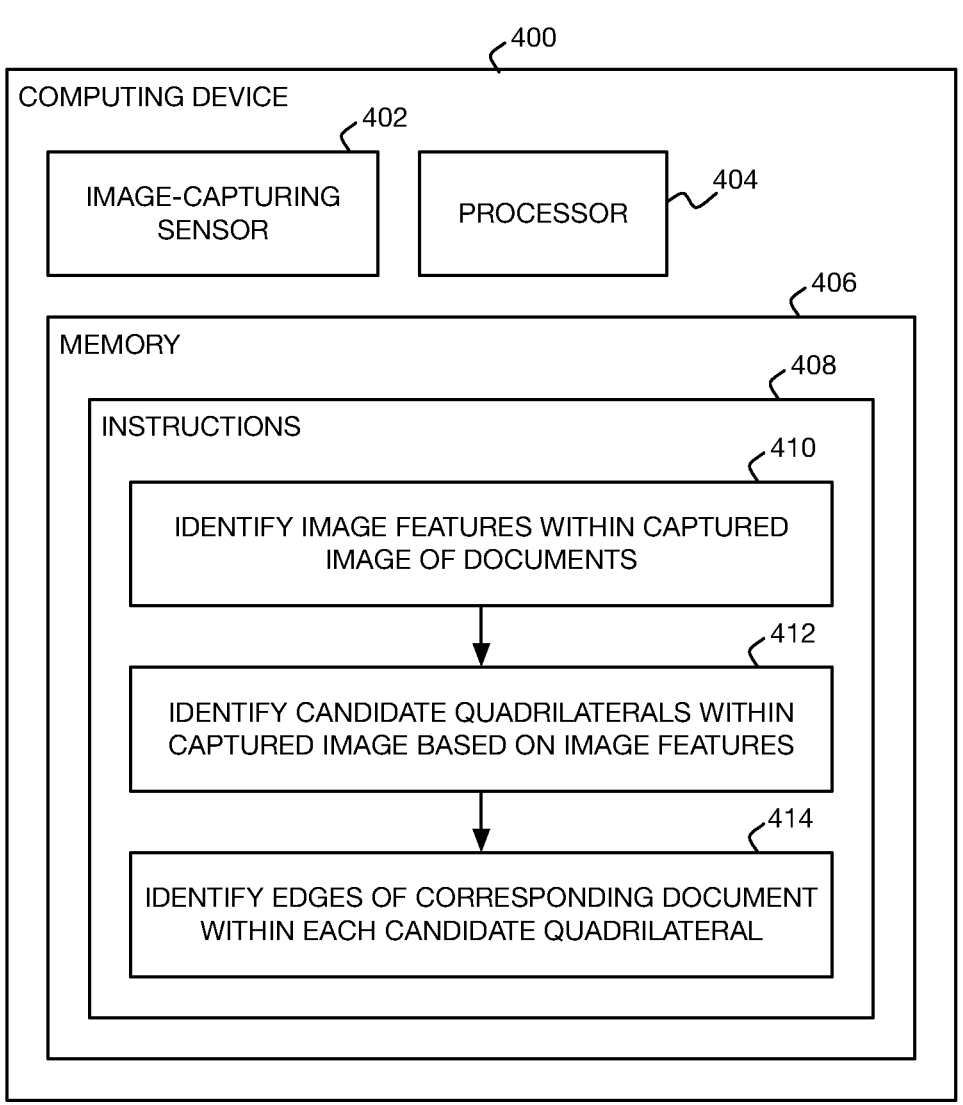
FIG. 4 is a block diagram of an example computing device that can identify edges of documents within a captured image.

FIG. 4 shows an example computing device 400. The computing device 400 may be a smartphone or other type of computing device that includes an image-capturing sensor 402, a processor 404, and memory 406 storing instructions. The image-capturing sensor 402 may also be referred to as a camera, and captures an image of multiple documents. The memory 406 is a type of non-transitory computer-readable data storage medium, and stores instructions 408 executable by the processor 404.

The processor 404 executes the instructions to identify image features within the captured image using a backbone machine learning model (410). The processor 404 executes the instructions to identify candidate quadrilaterals within the captured image based on the image features using a head machine learning model (412). The processor 404 executes the instructions to identify edges of a corresponding document of the captured image within each candidate quadrilateral using an edge detection technique (414).

The computing device 400 may itself apply the backbone machine learning model to the captured image to identify the image features and may itself apply the head machine learning model to the image features to identify the candidate quadrilaterals. The computing device 400 may similarly itself apply the edge detection technique to each candidate quadrilateral to identify edges of a corresponding document. However, in another implementation, the computing device 400 may not itself apply the machine learning models, and/or may not apply the edge detection technique.

Figures 5A, 5B:
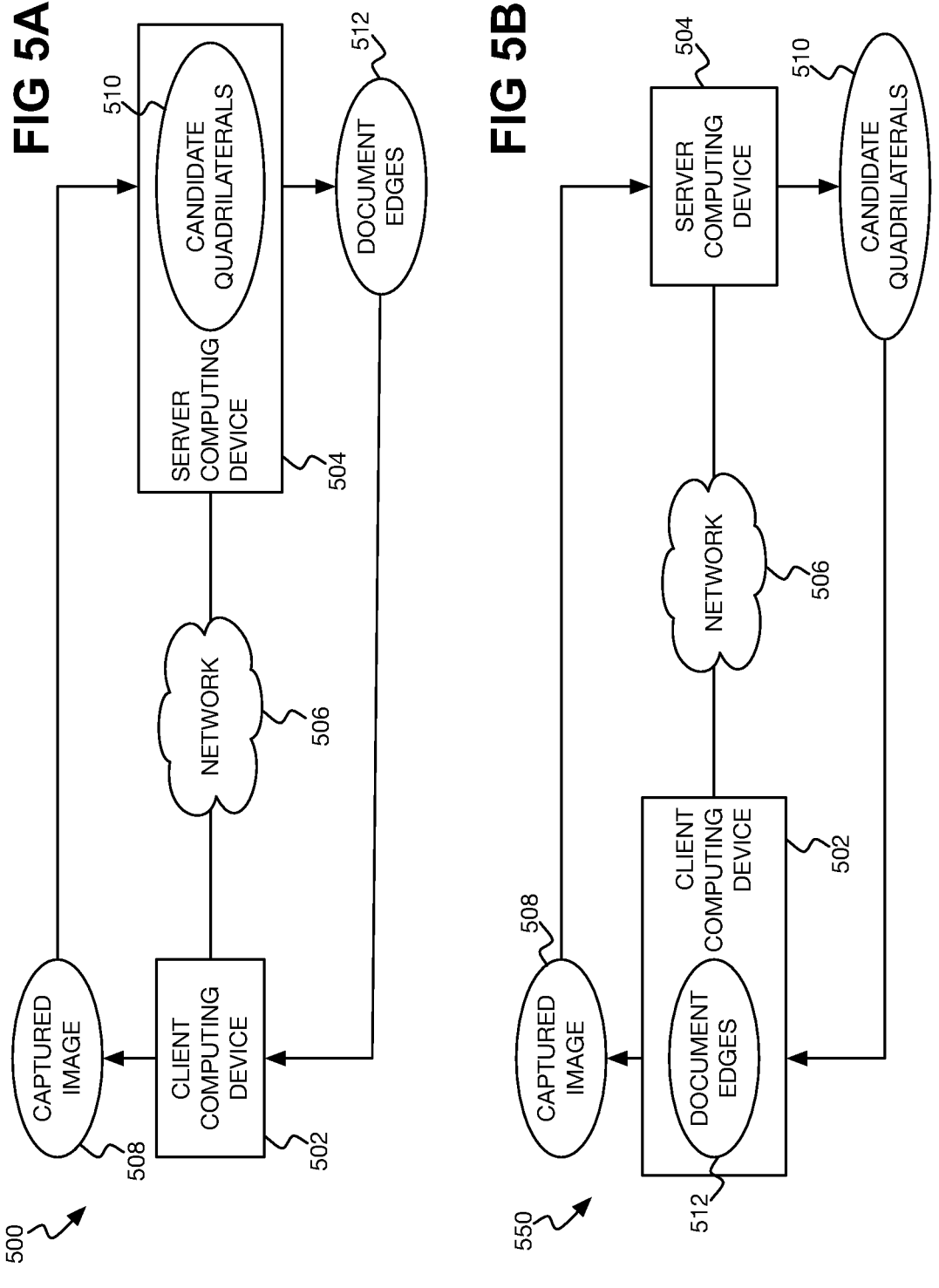
FIGS. 5A and 5B are diagrams of example systems in which edges of documents can be identified within a captured image.

FIGS. 5A and 5B show such example systems 500 and 550, respectively. Each system 500 and 550 includes a client computing device 502 and a server computing device 504 communicatively connected via a network 506. The client computing device 502 may be the computing device 400 of FIG. 4, and may thus be a smartphone or another type of computing device, such as a desktop, laptop, or notebook computer, for instance. The server computing device 504 may be a cloud computing server, and the network 506 may accordingly be or include the Internet. In both the systems 500 and 550, the client computing device 502 captures an image 508 of multiple documents and transmits the captured image 508 to the server computing device 504 over the network 506.

In the system 500 of FIG. 5A, the server computing device 504 identifies candidate quadrilaterals 510 including the documents (on the basis of image features that the server computing device 504 also identifies), such as per the process 100 of FIG. 1. The server computing device 504 also identifies the document edges 512 of the documents within the candidate quadrilaterals 510, again such as per the process 100, and transmits the document edges 512 back to the client computing device 502 over the network 506. The client computing device 502 can thus be said to in effect still identify the image features, the candidate quadrilaterals 510, and the document edges 512 via transmission of the captured image 508 of the documents to the server computing device 504, which may actually perform the process 100.

In the system 550 of FIG. 5B, by comparison, the server computing device 504 identifies the candidate quadrilaterals 510 (on the basis of image features that the server computing device 504 also identifies), such as per the process 100 of FIG. 1, but does not identify the document edges 512. Rather, the server computing device 504 transmits the candidate quadrilaterals 510 back to the client computing device 502 over the network 506, which itself can identify the document edges 512, such as per the process 100. However, the client computing device 502 can be said to in effect still identify the image features and the candidate quadrilaterals 510 via transmission of the captured image 508 of the documents to the server computing device 504, which may actually perform the process 100 as it relates to identification of the image features and the candidate quadrilaterals 510.

Techniques have been described for identifying the edges of each of multiple documents within a captured image. Multiple documents can therefore be more efficiently scanned. Rather than a user having to individually capture an image of each document, the user just has to capture one image of multiple documents (or multiple images that each include more than one document). The described techniques employ machine learning on a captured image to segment the image into candidate quadrilaterals that each include but do not well define a document of the image, and employ edge detection on each quadrilateral to then identify the edges of and thus well define a corresponding document.

We claim:
1. A non-transitory computer-readable data storage medium storing program code executable by a processor to perform processing comprising:
   identifying a plurality of image features of a plurality of documents within a captured image, by applying a backbone machine learning model to the captured image;
   identifying a plurality of candidate quadrilaterals within the captured image, by applying a head machine learning model to the image features identified by the backbone machine learning model, wherein the head machine learning model is a separate, different machine learning model from the backbone machine learning model; and
   identifying the plurality of documents within the captured image, by applying an edge detection technique to each candidate quadrilateral identified by the head machine learning model to identify edges within the candidate quadrilateral in order to determine whether the candidate quadrilateral actually corresponds to one of the documents within the captured image.

2. The non-transitory computer-readable data storage medium of claim 1, wherein the processing further comprises:
   performing an action on each document of the captured image based on the edges of the document that have been identified.

3. The non-transitory computer-readable data storage medium of claim 1, wherein the head machine learning model provides a probability for each candidate quadrilateral corresponding to a likelihood that the candidate quadrilateral includes one of the documents of the captured image.

4. The non-transitory computer-readable data storage medium of claim 3, wherein the processing further comprises:
   culling the candidate quadrilaterals, based on the probabilities of the candidate quadrilaterals.

5. The non-transitory computer-readable data storage medium of claim 4, wherein culling the candidate quadrilaterals comprises:
   discarding each candidate quadrilateral for which the probability is less than a threshold.

6. The non-transitory computer-readable data storage medium of claim 4, wherein the processing further comprises:
   outwardly increasing boundaries of each candidate quadrilateral that remains after culling.

7. The non-transitory computer-readable data storage medium of claim 6, wherein outwardly increasing boundaries of each candidate quadrilateral that remains after culling comprises:
   increasing each boundary of each candidate quadrilateral that remains after culling by a specified number of pixels.

8. The non-transitory computer-readable data storage medium of claim 1, wherein the backbone machine learning model comprises a convolutional neural network machine learning model.

9. The non-transitory computer-readable data storage medium of claim 8, wherein the head machine learning model comprises a one-shot convolutional neural network machine learning model.

10. The non-transitory computer-readable data storage medium of claim 9, wherein the edge detection technique comprises a non-machine learning image processing technique.

11. A computing device comprising:
   An image-capturing sensor to capture an image of a plurality of documents;
   A processor; and
   A memory storing instructions executable by the processor to:
   identify a plurality of image features of a plurality of documents captured within an image, by applying a backbone machine learning model to the captured image;

identify a plurality of candidate quadrilaterals within the captured image by applying a head machine learning model to the image features identified by the backbone machine learning model, wherein the head machine learning model is a separate, different machine learning model from the backbone machine learning model; and identify the plurality of documents within the captured image, by applying an edge detection technique to each candidate quadrilateral identified by the head machine learning model to identify edges within the candidate quadrilateral in order to determine whether the candidate quadrilateral actually corresponds to one of the documents within the captured image.

12. The computing device of claim 11, wherein the instructions are executable by the processor to further:

perform an action on each document of the captured image based on the edges of each document that have been identified.

13. The computing device of claim 11, wherein the head machine learning model provides a probability for each candidate quadrilateral corresponding to a likelihood that the candidate quadrilateral includes one of the documents of the captured image, and the instructions are executable by the processor to further:

cull the candidate quadrilaterals, based on the probabilities of the candidate quadrilaterals.

14. The computing device of claim 13, wherein the instructions are executable by the processor to further:

outwardly increase boundaries of each candidate quadrilateral that remains after culling.

15. The computing device of claim 11, wherein the instructions are executable by the processor to identify the image features within the captured image and to identify the candidate quadrilaterals based on the image features by transmitting the captured image to a different computing device over a network that applies the backbone machine learning model and the head machine learning model.

* * * * *